(12) United States Patent
Heckbert et al.

(10) Patent No.: US 7,369,136 B1
(45) Date of Patent: May 6, 2008

(54) COMPUTING ANISOTROPIC TEXTURE MAPPING PARAMETERS

(75) Inventors: Paul S. Heckbert, Pittsburgh, PA (US); Stuart F. Oberman, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 347 days.

(21) Appl. No.: 11/016,485

(22) Filed: Dec. 17, 2004

(51) Int. Cl.
*G09G 5/00* (2006.01)

(52) U.S. Cl. .................. 345/582; 345/587; 345/611

(58) Field of Classification Search .................. None
See application file for complete search history.

(56) References Cited

U.S. PATENT DOCUMENTS

| | | | |
|---|---|---|---|
| 5,528,003 A * | 6/1996 | Bodin et al. .................. 172/18 |
| 5,821,944 A | 10/1998 | Watkins | |
| 5,877,771 A | 3/1999 | Drebin et al. | |
| 6,005,582 A | 12/1999 | Gabriel et al. | |
| 6,040,837 A | 3/2000 | Wong et al. | |
| 6,104,415 A | 8/2000 | Gossett | |
| 6,252,698 B1 | 6/2001 | Oikawa | |
| 6,292,193 B1 * | 9/2001 | Perry et al. .................. 345/582 |
| 6,525,740 B1 * | 2/2003 | Cosman ....................... 345/584 |
| 6,664,971 B1 | 12/2003 | Mukherjee et al. | |
| 6,707,458 B1 | 3/2004 | Leather et al. | |
| 6,724,395 B1 | 4/2004 | Treichler | |
| 6,850,243 B1 | 2/2005 | Kilgariff et al. | |
| 6,876,362 B1 | 4/2005 | Newhall, Jr. et al. | |
| 6,919,904 B1 | 7/2005 | Kilgariff | |
| 6,947,054 B2 * | 9/2005 | Spangler ..................... 345/582 |
| 2002/0126133 A1 * | 9/2002 | Ewins ......................... 345/587 |
| 2003/0080963 A1 | 5/2003 | Van Hook et al. | |
| 2003/0164840 A1 | 9/2003 | O'Driscoll | |
| 2004/0119720 A1 | 6/2004 | Spangler | |
| 2004/0257376 A1 | 12/2004 | Liao et al. | |
| 2005/0219256 A1 * | 10/2005 | Donovan et al. ........... 345/586 |

OTHER PUBLICATIONS

Baoquan Chen et al., "Footprint Area Sampled Texturing", IEEE Transactions on Visualization and Computer Graphics, vol. 10 No. 2, Mar./Apr. 2004, pp. 230-240.*

"ATI's Optimized Texture Filtering Called Into Question," Tom's Hardware Guide, Jun. 3, 2004, <http://www20.graphics.tomshardware.com/graphic/20040603/index.html>.

Williams, Lance, "Pyramidal Parameters," Computer Graphics, vol. 17, No. 3, Jul. 1983.

Heckbert, Paul S., "Fundamentals of Texture Mapping and Image Warping," *Master's Thesis* under the direction of Carlo Sequin, University of California, Berkeley, Jun. 17, 1989.

(Continued)

*Primary Examiner*—Mark Zimmerman
*Assistant Examiner*—Jwalant Amin
(74) *Attorney, Agent, or Firm*—Patterson & Sheridan, L.L.P.

(57) ABSTRACT

A system and method for computing anisotropic texture mapping parameters by using approximation techniques reduces the complexity of the calculations needed to perform high quality anisotropic texture filtering. Anisotropic texture mapping parameters that are approximated may be computed using dedicated processing units within a graphics processor, thereby improving anisotropic texture mapping performance. Specifically, the major axis and minor axis of anisotropy are determined and their respective lengths are calculated using approximations. Other anisotropic texture mapping parameters, such as a level of detail for selecting a particular level are computed based on the calculated lengths of the major and minor axes.

23 Claims, 8 Drawing Sheets

OTHER PUBLICATIONS

Zwicker, Matthias et al, "EWA Splatting," IEEE Transactions on Visualization and Computer Graphics, IEEE Service Center, Jul.-Sep. 2002, vol. 8, No. 3, pp. 223-238.

Barkans, Anthony C., "High Quality Rendering Using the Talisman Architecture," SIGGRAPH/Eurographics Workshop, 1997.

"Anisotropic Texture Filtering," Meltdown 2/98 Prerelease, Direct3D Reference Rasterizer, Feb. 1998.

Talisman 3D Technology Briefing, Talisman Graphics & Multimedia System, Aug. 1996.

McCormack, Joe, et al., "Feline: Fast Elliptical Lines for Anisotropic Texture Mapping," Mitsubishi Electric Information Technology Center America, 2000.

Greene, Ned, et al., "Creating Raster Omnimax Images from Multiple Perspective Views Using the Elliptical Weighted Average Filter," IEEE Computer Graphics and Applications, vol. 6, Issue 6, pp. 21-27, Jun. 1986.

Heckbert, Paul, "Texture Mapping Polygons In Perspective," Computer Graphics Lab, New York Institute of Technology, Technical Memo No. 13, Apr. 28, 1983.

Ritter, Jack, "A Fast Approximation To 3D Euclidian Distance," *Graphics Gems*, edited by Andrew S. Glassner, pp. 432-433, Academic Press, Inc. 1990.

Ohashi, Yoshikazu, "Fast Linear Approximations of Euclidian Distance in Higher Dimensions," *Graphics Gems IV*, edited by Paul S. Heckbert, pp. 120-124, Academic Press, Inc. 1994.

* cited by examiner

| 200 $u_0,v_0,p_0$ | 201 $u_1,v_1,p_1$ |
|---|---|
| 202 $u_2,v_2,p_2$ | 203 $u_3,v_3,p_3$ |
FIG. 2A
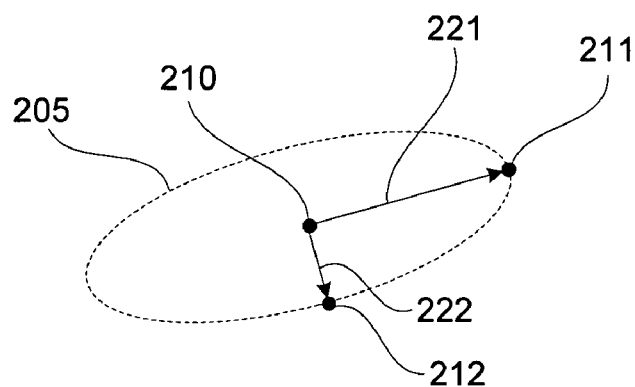
FIG. 2B
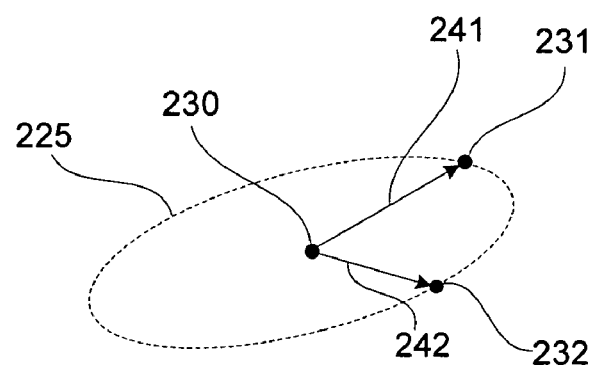
FIG. 2C

COMPUTING ANISOTROPIC TEXTURE MAPPING PARAMETERS

BACKGROUND OF THE INVENTION

1. Field of the Invention

Embodiments of the present invention generally relate to computer graphics, and more particularly to filtering texture map data.

2. Description of the Related Art

Conventional graphics processors are exemplified by systems and methods developed to read and filter texture map samples. To simplify the texture map filtering performed within a graphics processor, a texture is prefiltered and various resolutions forming an image pyramid or "mipmap" are stored. FIG. 1A is a conceptual diagram of prior art showing the levels of a mipmapped texture including the finest level, Level 101, and successively lower resolution levels, 102, 103, and 104.

The region in texture space corresponding to a pixel is called the pixel's "footprint". A pixel can be approximated with a circle in screen space. For texture mapping of 2-dimensional textures, the corresponding footprint in texture space can be approximated by an ellipse. In classic use of mipmaps, a mipmap level is chosen so that the footprint when scaled to that level is about 1 texel (texture pixel) in diameter. Then a bilinear filter is used to interpolate between the values of four texels forming a 2×2 square around the footprint center. This is called isotropic filtering, because it filters equally in the two texture space dimensions u and v. Although the filter yielding top image quality—the ideal filter—would have approximately elliptical shape, isotropic filtering approximates the ellipse with a circle, for low hardware cost and speed.

Anisotropic texture filtering attempts higher quality. It uses a filter that more closely matches the elliptical shape of the ideal filter. All ellipses have a largest diameter, which we call the major axis, and a smallest diameter, which we call the minor axis.

Isotropic filtering yields high quality images for pixels whose footprints have major and minor texture axes that are similar in length. But texture stretching, oblique viewing, and perspective can cause footprints to be very elongated. When isotropic filtering is used in such situations, the circle is never a good approximation to the ellipse. If it is too small (diameter close to the minor axis, say), the filter is too sharp, too few texels are averaged, and aliasing results, while if it is too large (diameter close to the major axis, say), the filter is too broad, too many texels are averaged, and blurring results. A Footprint 115 is a pixel footprint in texture space, with a Position 135 being the footprint center. FIG. 1B illustrates a prior art application of texture Level 101 applied to pixels of a Surface 140 that is receding in image space. When viewed in image space, Footprint 115 (an ellipse) appears as circle 116. While isotropic filtering of texture samples within a pixel footprint that forms a circle in texture space results in a high-quality image, isotropic filtering of texture samples within a pixel footprint that forms an ellipse, such as Footprint 115, results in an image with aliasing or blurring artifacts. In contrast to isotropic filtering, anisotropic filtering uses an elliptical or rectangular shaped filter pattern, resulting in fewer aliasing artifacts for footprints with major and minor axes that are not similar in length.

FIG. 1C illustrates Footprint 115 including a Minor Axis 125 that is significantly shorter than a Major Axis 130. Texture samples along Major Axis 130 are read from one or more mipmap levels and are blended to produce a pixel color. The levels the samples are read from is determined using a level of detail (LOD) value which is nominally the log base 2 of the length of Minor Axis 125. Fairly accurate computation of the length of Minor Axis 125 and Major Axis 130 is needed to produce a high quality image. However, an exact computation of the lengths of Major Axis 130 and Minor Axis 125 is expensive in terms of performance and/or die area. However, exactness is not necessary for adequate quality, and may not be practical to implement using a dedicated processing unit within a graphics processor.

Accordingly, there is a need to balance the accuracy used to compute anisotropic texture mapping parameters with image quality to minimize the die area needed to compute the anisotropic texture mapping parameters within a graphics processor.

SUMMARY OF THE INVENTION

The current invention involves new systems and methods for computing anisotropic texture mapping parameters. Anisotropic texture mapping parameters, such as the major axis and minor axis of anisotropy are calculated using approximations which maintain an acceptable level of image quality. Other anisotropic texture mapping parameters, such as the LOD are computed based on an approximation of the length of the minor axis. The approximations are computed using dedicated processing subunits which require less die area than the corresponding exact computations. Therefore, die area is reduced while maintaining anisotropic texture filtering quality.

Various embodiments of a method of the invention for computing anisotropic texture map parameters include computing the length of each of two difference vectors of an anisotropic footprint to produce a first length and a second length. The length of each of two diagonal difference vectors of the anisotropic footprint is computed to produce a third length and a fourth length. The anisotropic texture map parameters for the anisotropic footprint are computed based on the first length, the second length, the third length, and the fourth length.

Various embodiments of a method of the invention for determining a direction of anisotropy of a footprint of a pixel in texture space include receiving two difference vectors for the footprint. The length of each of the two difference vectors is approximated to produce a first length and a second length. The first length and the second length are compared to produce a major axis and a minor axis. The direction of anisotropy of the footprint is identified as the difference whose length is the major axis.

Various embodiments of the invention include an anisotropic unit for computing anisotropic texture mapping parameters. The anisotropic unit includes a difference vector computation unit, a length computation unit, and a parameter computation unit. The difference vector computation unit is configured to compute a first difference vector and a second difference vector, where the first difference vector is a partial derivative of texture coordinates u and v with respect to screen space x for a first pixel and a second pixel and the second difference vector is a partial derivative with respect to screen space y for the first pixel and a third pixel. The length computation unit is configured to compute a length of the first difference vector and a length of the second difference vector. The parameter computation unit is configured to compute the anisotropic texture mapping parameters using the length of the first difference vector and the length of the second difference vector.

Various embodiments of the invention include a programmable graphics processor for generating images using anisotropically filtered texture samples (texels).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A illustrates texture mapping parameters mapped to adjacent pixels in accordance with one or more aspects of the present invention.

FIG. 2B illustrates two vectors within an anisotropic footprint used to determine the major axis and the minor axis of anisotropy in accordance with one or more aspects of the present invention.

FIG. 2C illustrates two partial derivative vectors within an anisotropic footprint in accordance with one or more aspects of the present invention.

DETAILED DESCRIPTION

Figure 1A:
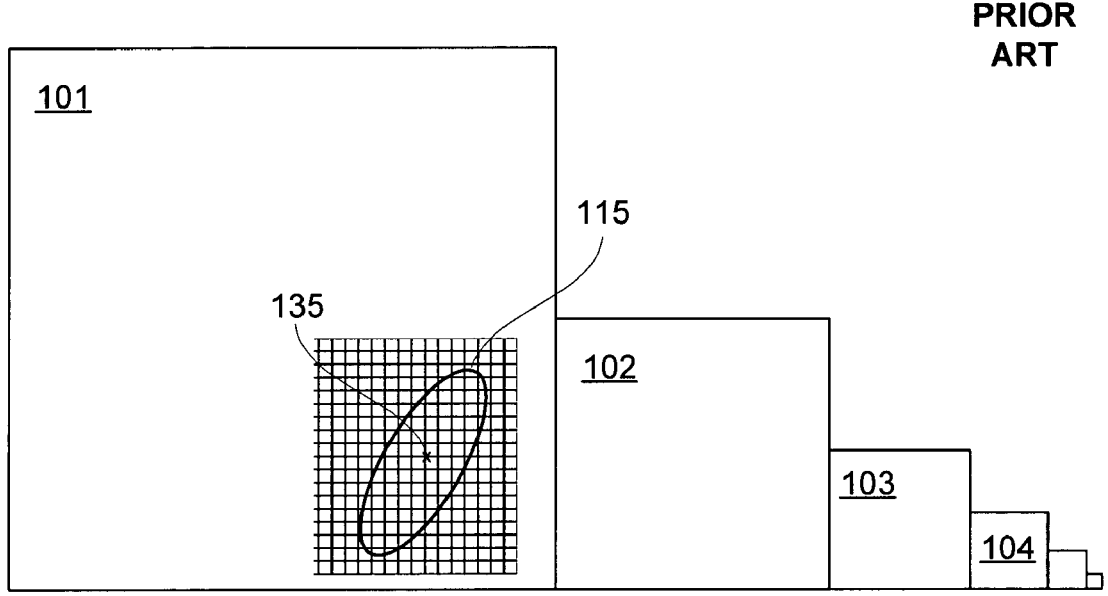
FIG. 1A is a conceptual diagram of prior art showing a mip mapped texture.
Figure 1B:
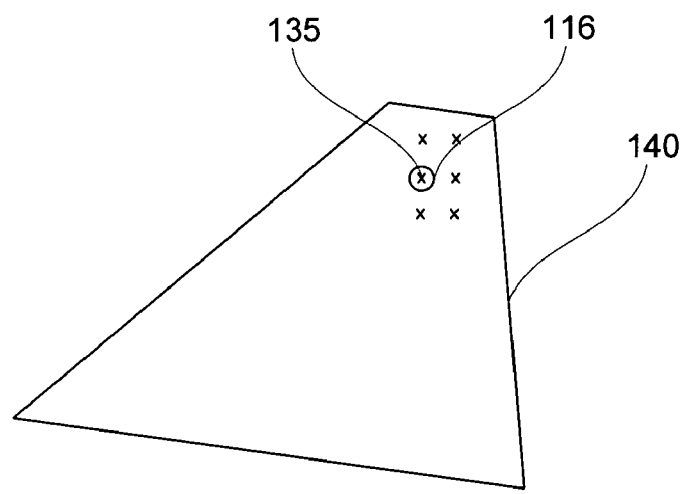
FIGS. 1B and 1C illustrate a prior art application of texture samples to a surface.
Figure 1C:
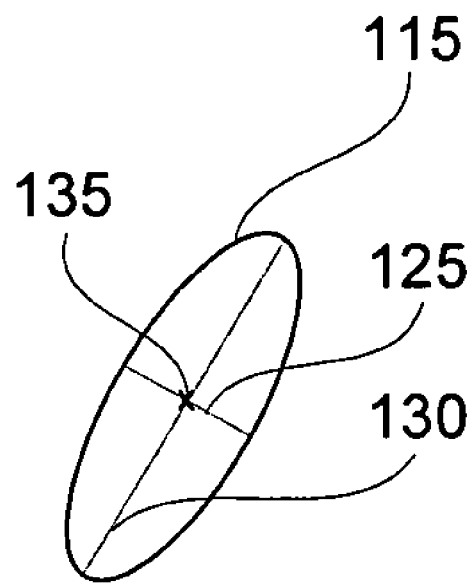

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The major and minor axes of anisotropy define a footprint that represents the projection of the pixel onto the texture map. In the prior art, exact determination of the major and minor axes requires complex computations which are not cost effective to implement within the die area constraints of graphics processors. The major and minor axes may be approximated, and the approximations may be used to compute parameters, such as lengths of the major and minor axes and LOD values, for anisotropic texture mapping. Furthermore, the approximations are computed using less die area and using fewer clock cycles. Therefore the anisotropic texture mapping parameters computed using approximations result in improved performance compared with exact computation of the anisotropic texture mapping parameters.

FIG. 2A shows four pixels in (x,y) screen space with their corresponding texture coordinates u, v, and p, a Pixel 200, a Pixel 201, a Pixel 202, and a Pixel 203, in accordance with one or more aspects of the present invention. Texture coordinate p is needed for mapping of three dimensional texture only; it is unused for mapping of two dimensional texture. Difference vectors are computed using at least some of the texture map coordinates shown in FIG. 2A. The difference vectors are used to determine the major and minor axes. In an alternate embodiment of the present invention, normalized texture coordinates such as s, t, and r are provided and unnormalized coordinates u, v, and p are computed by scaling s, t, and r by the texture map dimension such as width, height, or depth.

FIG. 2B shows the footprint of the four pixels, Pixels 200, 201, 202, and 203, in texture space. Points 210, 211, and 212 are the texture coordinates of Pixels 200, 201, and 202, respectively. Texture coordinates for Pixel 200, $u_0$, $v_0$, and $p_0$ are shown in FIG. 2B as Point 210 Texture coordinates for Pixel 201, $u_1$, $v_1$, and $p_1$ are shown in FIG. 2B as Point 211. Texture coordinates for Pixel 202, $u_2$, $v_2$, and $p_2$ are shown in FIG. 2B as Point 212. Difference Vector 221, the partial derivative of (u, v, p) with respect to x, is computed by subtracting Point 210 from Point 211. Difference Vector 222, the partial derivative of (u, v, p) with respect to y, is computed by subtracting Point 210 from Point 212.

The two difference vectors, Difference Vectors 221 and 222, are used to determine the major axis and the minor axis of anisotropy in accordance with one or more aspects of the present invention. The longer of Difference Vector 221 and Difference Vector 222 is the major axis and the shorter is the minor axis. Footprint 205, is the region of (u, v, p) texture space corresponding to Pixels 200, 201, 202, and 203. Texture mapping parameters computed based on Footprint 205 may be used to control the size, shape, and orientation of the footprint for anisotropic filtering for Pixels 200, 201, 202, and 203. The center positions of these footprints are given by the texture coordinates associated with each pixel, however.

FIG. 2C illustrates that two difference vectors, a Difference Vector 241 and a Difference Vector 242 are not always perpendicular. Therefore, they do not always define the exact major and minor axes of the elliptical footprint, such as footprint 225. Points in texture space, specifically, Points 230, 231, and 232, correspond to Pixels 200, 201, and 202, respectively. In cases where the difference vectors are not perpendicular, using only two difference vectors to calculate major and minor can be inaccurate, resulting in lower quality anisotropic texture filtering, for example, producing a blurred texture filtering result. However, during isotropic filtering, when a footprint bounded by a circle rather than an ellipse, using two difference vectors is adequate to achieve a high quality isotropically filtered image.

Figure 2D:
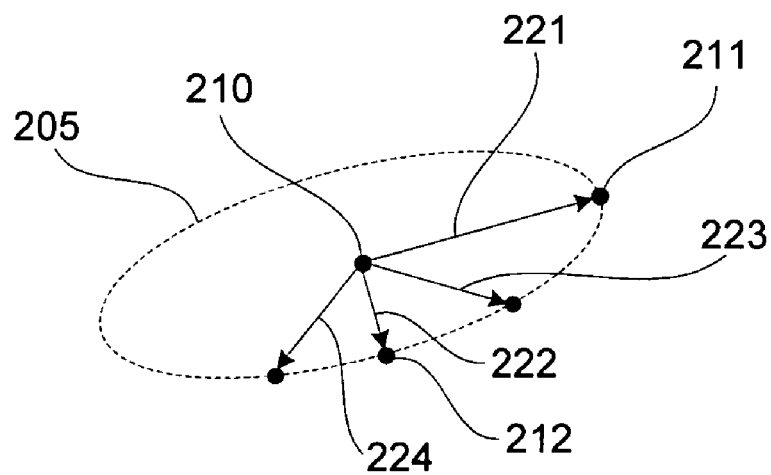
FIGS. 2D and 2E illustrate four vectors within an anisotropic footprint used to determine the major axis and the minor axis in accordance with one or more aspects of the present invention.

When two difference vectors are not adequate to calculate the major and minor axes, additional difference vectors may be used. FIG. 2D illustrates four difference vectors within anisotropic Footprint 205 used to determine the major axis and the minor axis in accordance with one or more aspects of the present invention. The four vectors include Difference Vector 221, and Difference Vector 222 described in conjunction with FIG. 2B, and diagonal difference vectors, a Difference Vector 223, and a Difference Vector 224. The longest of the four Difference Vectors 221, 222, 223, and 224 is the major axis and the shortest of the four Difference Vectors 221, 222, 223, and 224 is the minor axis. As previously described in conjunction with FIG. 2B, texture coordinates for Pixel 200, Pixel 201 and Pixel 202 are shown as Point 210, Point 211, and Point 212, respectively.

Difference Vector 223 is computed by summing Difference Vector 221 and Difference Vector 222 and dividing the sum by the square root of 2, i.e., sqrt(2). Likewise, Difference Vector 224 is computed by subtracting Difference Vector 221 from Difference Vector 222 and dividing the difference by sqrt(2). In the example shown in FIG. 2D, Difference Vector 221 corresponds to the major axis of Footprint 205 and Difference Vector 222 corresponds to the minor axis of Footprint 205. Division by sqrt(2) is necessary in order to properly normalize the summed difference vectors. Otherwise, on an isotropic footprint, when Difference Vector 241 and Difference Vector 242 have equal length, Difference Vector 231 and Difference Vector 244 will always exceed the true footprint diameter by a factor of sqrt(2), and will yield an LOD value that is too large.

Figure 2E:
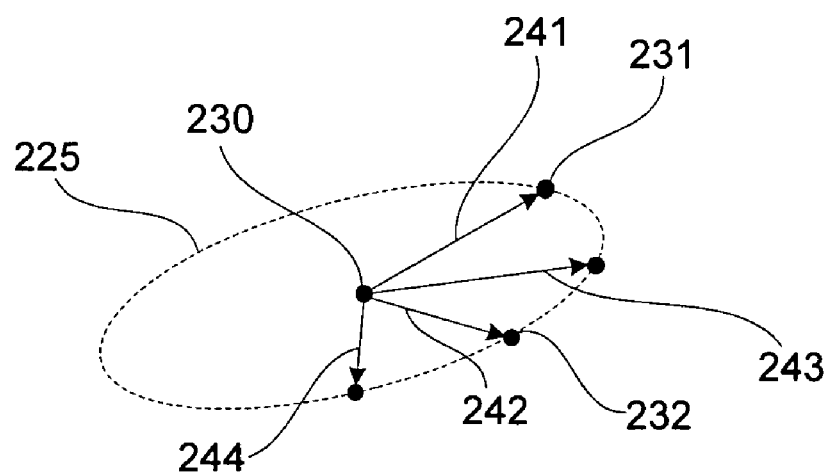

FIG. 2E illustrates four vectors within anisotropic Footprint 225 used to determine the major axis and the minor axis in accordance with one or more aspects of the present invention. Using four difference vectors instead of two difference vectors to estimate the major and minor axes improves the accuracy of the estimates of the footprint's size and orientation. Therefore, resulting in higher quality anisotropic texture filtering, i.e., the texture filtering result is not too aliased and not too blurry.

The four vectors include Difference Vector 241, and Difference Vector 242 described in conjunction with FIG. 2C, Difference Vector 243, and Difference Vector 244. In the example shown in FIG. 2E, none of the difference vectors is the exact major axis or exact minor axis of Footprint 225. As previously described in conjunction with FIG. 2C, texture coordinates for Pixels 200, 201, and 202 are shown as Points 230, 231, and 232, respectively.

In footprint 225, Difference Vector 231 and Difference Vector 232 are not perpendicular to each other and they do not accurately represent the major and minor axes, respectively. Difference Vector 243 approximates the major axis of Footprint 225 and is computed by summing Difference Vector 241 and Difference Vector 242 and dividing the sum by sqrt(2). Likewise, Difference Vector 244 approximates the minor axis of Footprint 225 and is computed by subtracting Difference Vector 241 from Difference Vector 242 and dividing the difference by sqrt(2).

Figure 3A:
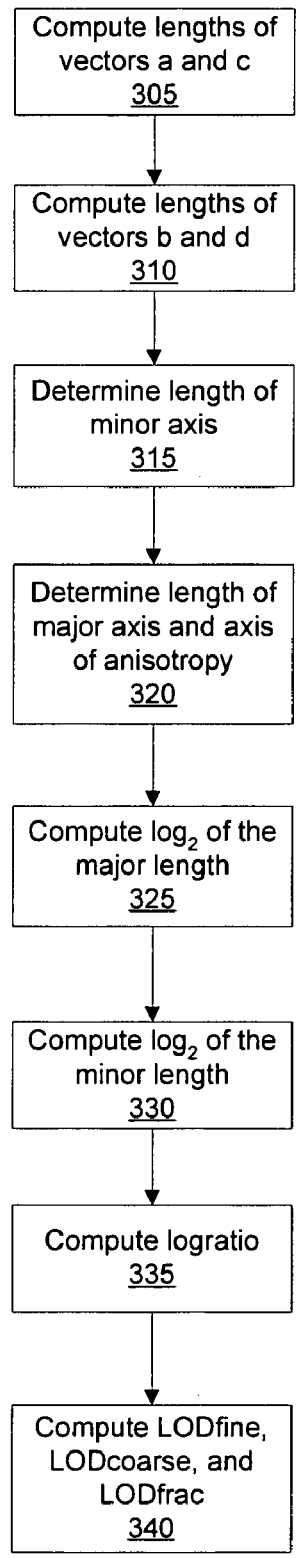
FIG. 3A illustrates an embodiment of a method of computing anisotropic texture mapping parameters in accordance with one or more aspects of the present invention.

FIG. 3A illustrates an embodiment of a method of computing anisotropic texture mapping parameters in accordance with one or more aspects of the present invention. In step 305 lengths of vectors a and c are computed using three texture points. Vector a corresponds to the partial derivative of (u, v, p) with respect to x, such as Difference Vector 221, shown in FIGS. 2B and 2D and Difference Vector 241, shown in FIGS. 2C and 2E. In step 310 lengths of vectors b and d, the diagonal difference vectors, are computed using difference vectors a and c, as previously described in conjunction with FIG. 2D. Vector b corresponds to Difference Vector 223 in FIG. 2D and Difference Vector 243 in FIG. 2E. Vector d corresponds to Difference Vector 224 in FIG. 2D and Difference Vector 244 in FIG. 2E.

In step 315 the length of the minor axis is determined by comparing the lengths of vectors a, b, c, and d and selecting the shortest length as the length of the minor axis. In step 320 the length of the major axis is determined by comparing the lengths of vectors a, b, c, and d and selecting the longest length as the length of the major axis. The vector with the longest length is the axis of anisotropy along which texels are sampled for anisotropic filtering.

In step 325 the base-two logarithm (log) of the major axis length is computed to produce a logmajor value. In step 330 the base-two log of the minor axis length is computed to produce a logminor value. In step 335 a logratio value is computed by subtracting the logmajor value from the logminor value, therefore the ratio is always between 0 and 1. The logratio value is equivalent to the base-two log of the ratio value. In embodiments of the present invention supporting a maximum anisotropy of 16:1, the logratio value ranges from −4 to 0, where a logratio value of 0 indicates an isotropic footprint. Increasing the logratio value decreases the number of texels averaged. Performing computations in log space simplifies the computations and may be more efficient; for example, subtraction in log space is used instead of division. Likewise, addition is used instead of multiplication.

In some embodiments of the present invention the logratio is modified in step 335 based on state parameters such as lodbias and maxaniso, which may be fixed or programmed. The first modification is the addition of an "anisotropic bias" term, lodbias, which has the effect of fattening the footprint. In some embodiments of the present invention, mipmap levels are numbered such that level 0 is the highest resolution, "base" level, and level k is half the size in each dimension of level k−1, for all k up to the apex of the pyramid.

A second modification is to clamp logratio to a minimum value based on the maximum allowed anisotropy setting, maxaniso. Specifically, logratio is clamped to greater than or equal to the negative of the log 2 of maxaniso. The maxaniso setting might be 16 or 8, for example. The target level of detail, LODt, is then defined as the sum of logmajor and logratio.

Using LODt has the effect of keeping the major axis fixed, while permitting either the maxaniso setting or the lodbias to fatten the footprint, increasing its minor axis. Fattening the footprint results in a little blurring. Shortening the major axis, on the other hand, would add aliasing, which is usually more objectionable. The processing time cost of anisotropic filtering for a pixel is typically proportional to the anisotropy of its footprint, so fattening the footprint may improve performance. Isotropic filtering is simply the special case of anisotropic filtering where maxaniso=1.

When performing anisotropic filtering with trilinear interpolation between mipmap levels, the two LODs should be calculated as follows. In step 340 the fine texture map LOD, LODfine, is set to the integer portion of LODt, and the coarse level LOD, LODcoarse, is set to LODfine+1. Interpolation between the two levels is performed according to the LODfrac parameter, which equals the fractional part of LODt. When performing anisotropic filtering with bilinear (not trilinear) filtering, the single LODfine is calculated by rounding LODt to the nearest integer. LODcoarse and LODfrac are irrelevant for bilinear filtering.

Figure 3B:
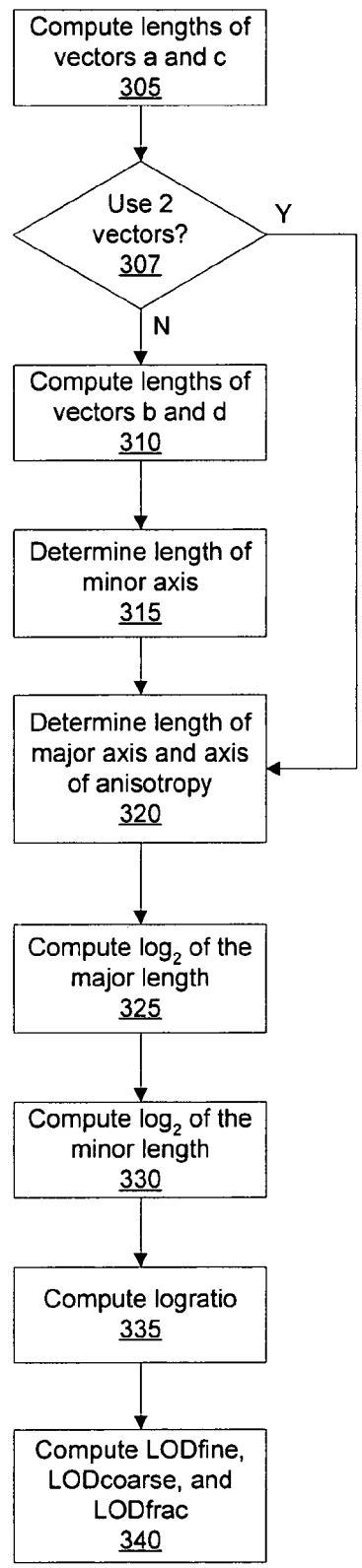
FIG. 3B illustrates another embodiment of a method of computing anisotropic texture mapping parameters in accordance with one or more aspects of the present invention.

FIG. 3B illustrates another embodiment of a method of computing anisotropic texture mapping parameters in accordance with one or more aspects of the present invention. FIG. 3B includes the steps shown in FIG. 3A. In step 305 lengths of vectors a and c are computed. In step 307 the method determines if a texture map option, two vector option, specifies that only two vectors should be used for determining the major and minor axis. In some embodiments of the present invention the two vector option may be enabled or disabled separately for anisotropic filtering and isotropic filtering.

If, in step 307 the method determines that the two vector option is specified, the method proceeds directly to step 320. Otherwise, the method proceeds to step 310 and completes steps 310 and 315 as previously described. Steps 320 through 340 are completed as previously described in conjunction with FIG. 3A.

Figure 4:
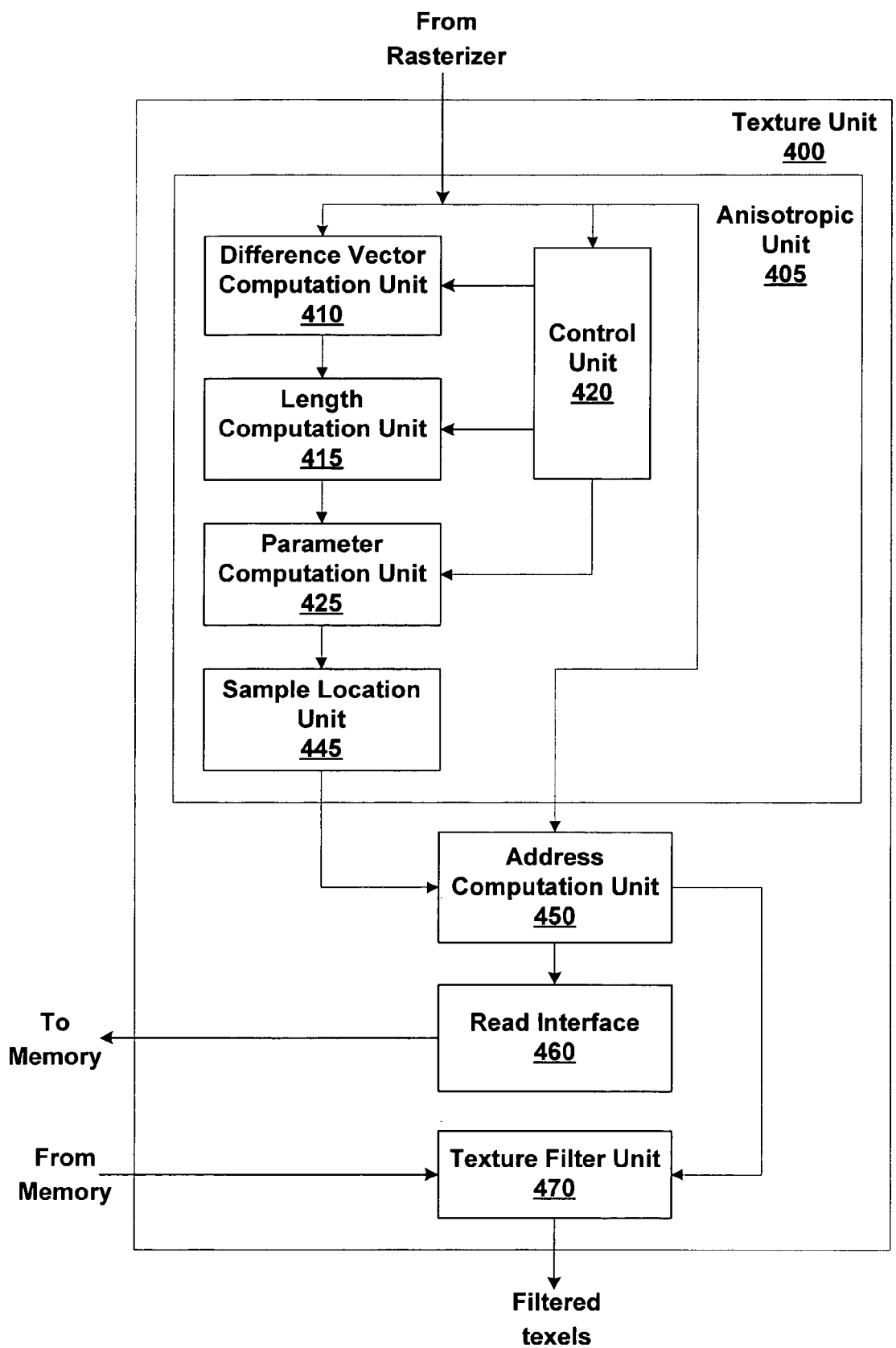
FIG. 4 is a block diagram of a texture unit in accordance with one or more aspects of the present invention.
Figure 5:
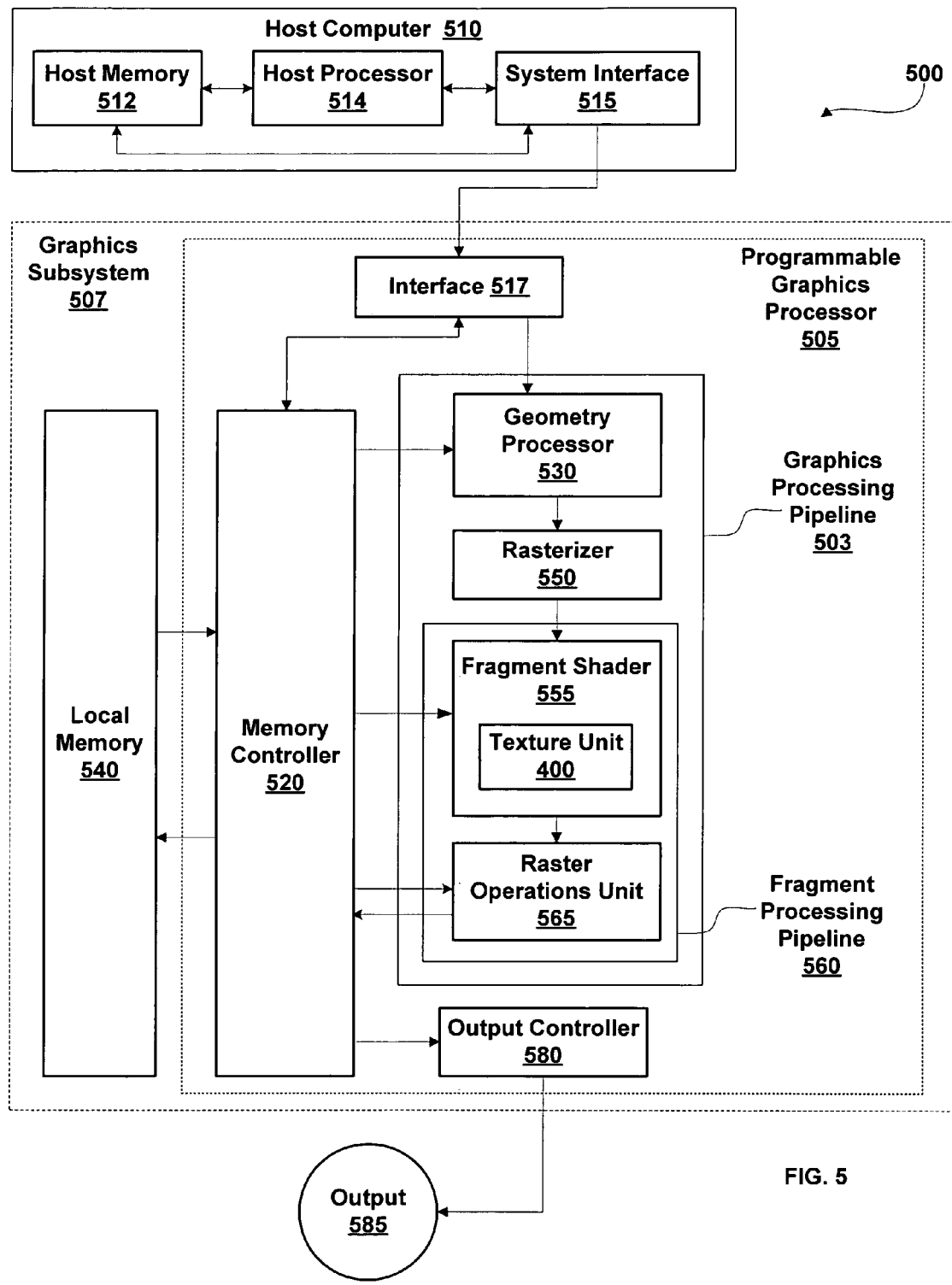
FIG. 5 is a block diagram of an exemplary embodiment of a respective computer system in accordance with one or more aspects of the present invention including a host computer and a graphics subsystem.

FIG. 4 is a block diagram of a portion of a graphics processing pipeline, described in conjunction with FIG. 5. The graphics processing pipeline includes a Texture Unit 400 in accordance with one or more aspects of the present invention. In some embodiments, Texture Unit 400 receives data from a rasterizer, e.g., program instructions, and parameters associated with fragments (texture IDs, texture coordinates such as s and t, and the like). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments. Texture Unit 400 receives texture coordinates from a rasterizer, uses the texture coordinates to perform anisotropic texture filtering of texels read from memory, and then outputs texture colors.

Texture Unit 400 includes an Anisotropic Unit 405. At a high level, Anisotropic Unit 405 computes anisotropic texture mapping parameters such as the LOD, the logratio, and the major axis direction from the texture coordinates. These anisotropic texture mapping parameters are used to determine the number, position, and weight of texels to perform texture filtering for a pixel. A Control Unit 420 within Anisotropic Unit 405 processes the program instructions, to initiate computation of the anisotropic texture mapping parameters. Difference Vector Computation Unit 410 computes partial derivatives (difference vectors) by subtracting texture coordinates for adjacent pixels in the x direction and adjacent pixels in the y direction. Texture coordinates s, t, and r are typically represented in a floating point format such as a 32 bit format (1 bit sign, 23 bit mantissa, and 8 bit exponent). The partial derivatives are ds/dx, dt/dx, ds/dy, and dt/dy. For some embodiments of the present invention, the partial derivatives may also include dr/dx and dr/dy. Several bits of the mantissa of the partial derivatives may be discarded, for example the mantissa may be reduced to 9 bits in some embodiments of the present invention.

If the input texture coordinates are in normalized form, the partial derivatives are scaled by a dimension, either the width or height or depth, of the highest resolution (LOD0) level of the mipmap to compute partial derivatives of unnormalized texture coordinates, such as u, v, and p. The width and height are provided to Difference Vector Computation Unit 410 by Control Unit 420. The width or height is converted to a floating point format as needed prior to the scaling. When only power of two texture maps are used, the scaling may be performed by incrementing the exponents of the partial derivatives of texture coordinates s, t, and r and any multipliers included in Difference Vector Computation Unit 410 for non-power of two texture maps can be eliminated. The partial derivatives of the unnormalized texture coordinates are the difference vectors output by Difference Vector Computation Unit 410, such as difference vectors a and c. Additional difference vectors, such as vectors b and d may be computed, as previously described, from difference vectors a and c.

A Length Computation Unit 415 receives the difference vectors and computes the length of each difference vector to determine the major and minor axis. The exact length of each difference vector is the square root of the sum of each component squared. The length may be approximated using techniques known to those skilled in the art. For example, a technique for approximating Euclidean distance is described in *A Fast Approximation to 3D Euclidean Distance*, Jack Ritter, Graphics Gems, Glassner, ed., pp. 432-433. The length may be approximated as $$\text{length}=x+y*11/32+z/4,$$

where x, y, and z are sorted components of the difference vector. The components are sorted so that $x>=y>=z>=0$. Another technique for approximating Euclidean distance is described in *Fast Linear Approximations of Euclidean Distance in Higher Dimensions*, Yoshikazu Ohashi, Graphics Gems IV, Heckbert, ed., pp. 120-124. The length may be approximated as $$\text{length}=x*0.9398+y*0.3893+z*0.2987.$$

Length Computation Unit 415 sorts the components of each difference vector and computes the lengths using either of the techniques previously described or using another technique known to those skilled in the art. In some embodiments of the present invention, the lengths are computed using floating point operations and the lengths are represented using an 18 bit floating point format (1 bit sign, 9 bit mantissa, and 8 bit exponent). When the two vector option is used, Length Computation Unit 415 outputs the lengths of difference vectors a and c. When the two vector option is not used, Length Computation Unit 415 outputs the lengths of difference vectors a, b, c, and d. The two vector option enable/disable is provided to Length Computation Unit 415 by Control Unit 420. In alternate embodiments of the present invention, additional difference vectors and difference vector lengths may be computed.

Parameter Computation Unit 425 receives the difference vector lengths output by Length Computation Unit 415, determines the major and minor axes and computes the logratio, the LOD values, and the major axis direction. As described in conjunction with steps 315 and 320 of FIGS. 3A and 3B, Parameter Computation Unit 425 compares the difference vector lengths and identifies the difference vector corresponding to the longest length as the axis of anisotropy. The major axis is the longest length and the minor axis is the shortest length. Parameter Computation Unit 425 also completes steps 325, 330, 335, and 340 described in conjunction with FIGS. 3A and 3B. In some embodiments of the present invention, Parameter Computation Unit 425 applies an anisotropic bias and a maxaniso setting to the logratio. Parameter Computation Unit 425 outputs the axis of anisotropy, the logratio, and the LOD values to a Sample Location Unit 445. The logratio and LOD values are computed using fixed point operations and are represented as fixed point numbers, for example logratio can be 3 bits of signed integer, and 8 bits of fraction, and LOD can be 4 bits of unsigned integer and 8 bits of fraction.

Sample Location Unit 445 determines a first number of texels to be read from the level specified by LODfine and a second number of texels to be read from the level specified by LODcoarse. Sample Location Unit 445 determines the locations, e.g., texture coordinates, of the texels. Sample Location Unit 445 also computes weights, using techniques known to those skilled in the art, for use during filtering of the texels read from the level specified by LODfine and the level specified by LODcoarse.

Sample Location Unit 445 outputs sample locations, weights, LODfrac, LODfine, and LODcoarse to an Address Computation Unit 450. Address Computation Unit 450 uses texture parameters (texture ID, and the like) received by Texture Unit 400 to determine addresses for reading texels (the first number of texels or the first and the second number of texels) from memory. Address Computation Unit 450 outputs the addresses to a Read Interface 460. Read Interface 460 outputs the addresses and a read request to a memory, e.g., cache, RAM, ROM, or the like. Texels read from memory are received from the memory by a Texture Filter Unit 470. Texture Filter Unit 470 receives the weights from Address Computation Unit 450 and filters the texels read from memory using a linear combination of texels to produce filtered texels. The filtered texels are further processed within a fragment shader, to compute a color for each fragment.

FIG. 5 is a block diagram of an exemplary embodiment of a Computing System generally designated 500 and including a Host Computer 510 and a Graphics Subsystem 507 including an embodiment of Texture Unit 400. Computing System 500 may be a desktop computer, server, laptop computer, palm-sized computer, tablet computer, game console, portable wireless terminal such as a PDA or cellular telephone, computer based simulator, or the like. Host computer 510 includes Host Processor 514 that may include a system memory controller to interface directly to Host Memory 512 or may communicate with Host Memory 512 through a System Interface 515. System Interface 515 may be an I/O (input/output) interface or a bridge device including the system memory controller to interface directly to Host Memory 512. An example of System Interface 515 known in the art includes Intel® Northbridge.

Host computer 510 communicates with Graphics Subsystem 507 via System Interface 515 and an Interface 517. Graphics Subsystem 507 includes a Local Memory 540 and a Programmable Graphics Processor 505. Programmable Graphics Processor 505 uses memory to store graphics data, including texture maps, and program instructions, where graphics data is any data that is input to or output from computation units within Programmable Graphics Processor 505. Graphics memory is any memory used to store graphics data or program instructions to be executed by Programmable Graphics Processor 505. Graphics memory can include portions of Host Memory 512, Local Memory 540 directly coupled to Programmable Graphics Processor 505, storage resources coupled to the computation units within Programmable Graphics Processor 505, and the like. Storage resources can include register files, caches, FIFOs (first in first out memories), and the like.

In addition to Interface 517, Programmable Graphics Processor 505 includes a Graphics Processing Pipeline 503, a Memory Controller 520 and an Output Controller 580. Data and program instructions received at Interface 517 can be passed to a Geometry Processor 530 within Graphics Processing Pipeline 503 or written to Local Memory 540 through Memory Controller 520. In addition to communicating with Local Memory 540, and Interface 517, Memory Controller 520 also communicates with Graphics Processing Pipeline 503 and Output Controller 580 through read and write interfaces in Graphics Processing Pipeline 503 and a read interface in Output Controller 580.

Within Graphics Processing Pipeline 503, Geometry Processor 530 and a programmable graphics fragment processing pipeline, Fragment Processing Pipeline 560, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 530 and Fragment Processing Pipeline 560 are optionally configured such that data processing operations are performed in multiple passes through Graphics Processing Pipeline 503 or in multiple passes through Fragment Processing Pipeline 560. Each pass through Programmable Graphics Processor 505, Graphics Processing Pipeline 503 or Fragment Processing Pipeline 560 concludes with optional processing by a Raster Operations Unit 565.

Vertex programs are sequences of vertex program instructions compiled by Host Processor 514 for execution within Geometry Processor 530 and Rasterizer 550. Shader programs are sequences of shader program instructions compiled by Host Processor 514 for execution within Fragment Processing Pipeline 560. Geometry Processor 530 receives a stream of program instructions (vertex program instructions and shader program instructions) and data from Interface 517 or Memory Controller 520, and performs vector floating-point operations or other processing operations using the data. The program instructions configure subunits within Geometry Processor 530, Rasterizer 550 and Fragment Processing Pipeline 560. The program instructions and data are stored in graphics memory, e.g., portions of Host Memory 512, Local Memory 540, or storage resources within Programmable Graphics Processor 505. When a portion of Host Memory 512 is used to store program instructions and data the portion of Host Memory 512 can be uncached so as to increase performance of access by Programmable Graphics Processor 505. Alternatively, configuration information is written to registers within Geometry Processor 530, Rasterizer 550 and Fragment Processing Pipeline 560 using program instructions, encoded with the data, or the like.

Data processed by Geometry Processor 530 and program instructions are passed from Geometry Processor 530 to a Rasterizer 550. Rasterizer 550 is a sampling unit that processes primitives and generates sub-primitive data, such as fragment data, including parameters associated with fragments (texture IDs, texture coordinates, and the like). Rasterizer 550 converts the primitives into sub-primitive data by performing scan conversion on the data processed by Geometry Processor 530. Rasterizer 550 outputs fragment data and shader program instructions to Fragment Processing Pipeline 560.

The shader programs configure the Fragment Processing Pipeline 560 to process fragment data by specifying computations and computation precision. Fragment Shader 555 is optionally configured by shader program instructions such that fragment data processing operations are performed in multiple passes within Fragment Shader 555. Fragment Shader 555 includes an embodiment of previously described Texture Unit 400 to perform anisotropic or isotropic texture mapping and produce filtered texels. The filtered texels are processed using techniques known to those skilled in the art to produce shaded fragment data. Texture Unit 400 approximates anisotropic texture mapping parameters to produce high quality images while reducing the die area needed to compute the parameters and improving performance compared with exact computation of the parameters.

Fragment Shader 555 outputs the shaded fragment data, e.g., color and depth, and codewords generated from shader program instructions to Raster Operations Unit 565. Raster Operations Unit 565 includes a read interface and a write interface to Memory Controller 520 through which Raster Operations Unit 565 accesses data stored in Local Memory 540 or Host Memory 512. Raster Operations Unit 565 optionally performs near and far plane clipping and raster operations, such as stencil, z test, blending, and the like, using the fragment data and pixel data stored in Local Memory 540 or Host Memory 512 at a pixel position (image location specified by x,y coordinates) associated with the processed fragment data. The output data from Raster Operations Unit 565 is written back to Local Memory 540 or Host Memory 512 at the pixel position associated with the output data and the results, e.g., image data are saved in graphics memory.

When processing is completed, an Output 585 of Graphics Subsystem 507 is provided using Output Controller 580. Alternatively, Host Processor 514 reads the image stored in Local Memory 540 through Memory Controller 520, Interface 517 and System Interface 515. Output Controller 580 is optionally configured by opcodes to deliver data to a display device, network, electronic control system, other Computing System 500, other Graphics Subsystem 507, or the like.

While the foregoing is directed to embodiments of the present invention, other and further embodiments of the invention may be devised without departing from the basic scope thereof, and the scope thereof is determined by the claims that follow. Specifically, persons skilled in the art will recognize that the anisotropic texture mapping parameter computation techniques set forth herein may be implemented either partially or entirely in a software program or a shader program executed by Fragment Shader 555. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of computing anisotropic texture map parameters to define an anisotropic footprint representing a projection of a pixel onto a texture map in a graphics processor, comprising:
    determining a two vector option is specified;
    computing the length of each of two difference vectors of the anisotropic footprint to produce a first length and a second length;
    computing the length of each of two diagonal difference vectors of the anisotropic footprint to produce a third length and a fourth length;
    computing the anisotropic texture map parameters for the anisotropic footprint based on the first length, the second length, the third length, and the fourth length; and
    identifying a major axis anisotropic texture map parameter as the longer of the first length and the second length.

2. The method of claim 1, wherein a first difference vector of the two difference vectors is a partial derivative of texture map coordinates with respect to x and a second difference vector of the two difference vectors is a partial derivative of texture map coordinates with respect to y.

3. The method of claim 1, further comprising the step of computing the two difference vectors using texture map coordinates of three pixels within a 2×2 pixel square.

4. The method of claim 1, wherein one of the two diagonal difference vectors is computed as a product of 1/sqrt(2) and the sum of the two difference vectors.

5. The method of claim 1, wherein one of the two diagonal difference vectors is computed as a product of 1/sqrt(2) and the difference of the two difference vectors.

6. The method of claim 1, further comprising the step of identifying a major axis anisotropic texture map parameter as a longest of the first length, the second length, the third length, and the fourth length upon determining that the two difference vectors are inadequate to calculate the major axis.

7. The method of claim 6, further comprising the step of identifying a minor axis anisotropic texture map parameter as a shortest of the first length, the second length, the third length, and the fourth length.

8. The method of claim 7, further comprising the step of computing a level of detail anisotropic texture map parameter.

9. The method of claim 6, wherein a level of detail anisotropic texture map parameter is computed as a sum of a base-two logarithm of the major axis anisotropic texture map parameter and a logratio, where the logratio is the difference between the base-two logarithm of the minor axis anisotropic texture map parameter and a base-two logarithm of the major axis anisotropic texture map parameter.

10. The method of claim 7, wherein the logratio is clamped to a minimum value based on a maximum allowed anisotropy setting.

11. A method of determining a direction of anisotropy of a footprint of a pixel in texture space where the footprint represents the projection of the pixel onto a texture map, comprising:
    receiving two difference vectors for the footprint;
    approximating the length of each of the two difference vectors to produce a first length and a second length;
    comparing the first length and the second length to produce a major axis and a minor axis including computing two diagonal difference vectors for the footprint using the two different vectors;
    approximating the length of each of the two diagonal difference vectors to produce a third length and a fourth length;
    comparing the third length and the fourth length to the first length and the second length to produce the major axis and the minor axis; and
    identifying the direction of anisotropy of the footprint based on which length is the major axis.

12. The method of claim 11, further comprising the step of scaling each of the two difference vectors by a texture map dimension.

13. The method of claim 11, further comprising the step of discarding at least two bits of each coordinate of each of the two difference vectors prior to the step of approximating the length of each of the two difference vectors.

14. The method of claim 11, further comprising the step of computing a level of detail anisotropic texture map parameter using the major axis and the minor axis.

15. The method of claim 11, further comprising the step of sampling a texture map along a direction of anisotropy indicated by the major axis.

16. An anisotropic unit for computing anisotropic texture mapping parameters, comprising:
    a difference vector computation unit configured to compute a first difference vector and a second difference vector, where the first difference vector is a partial derivative with respect to x computed using texture coordinates for a first pixel and a second pixel and the second difference vector is a partial derivative with respect to y computed using texture coordinates for the first pixel and a third pixel;
    a length computation unit configured to compute a length of the first difference vector and a length of the second difference vector; and
    a parameter computation unit configured to compute the anisotropic texture mapping parameters using the length of the first difference vector and the length of the second difference vector including identifying a major axis anisotropic texture mapping parameter as a longest of the length of the first difference vector, the length of the second difference vector, and the lengths of the two diagonal difference vectors.

17. The anisotropic unit of claim 16, wherein the difference vector computation unit is configured to compute two diagonal difference vectors using the first difference vector and the second difference vector.

18. The anisotropic unit of claim 17, wherein the length computation unit is configured to compute a length of each of the two diagonal difference vectors to produce diagonal difference vector lengths.

19. The anisotropic unit of claim 18, wherein the parameter computation unit is configured to identify a minor axis anisotropic texture mapping parameter as a shortest of the length of the first difference vector, the length of the second difference vector, and the two diagonal difference vector lengths.

20. The anisotropic unit of claim 18, wherein the parameter computation unit is configured to compute a level of detail anisotropic texture mapping parameter.

21. The anisotropic unit of claim 19, wherein the parameter computation unit is configured to compute a logratio using the length of the first difference vector and the length of the second difference vector.

22. The anisotropic unit of claim 21, wherein the parameter computation unit is configured to apply an anisotropic bias to the logratio.

23. The anisotropic unit of claim 21, wherein the parameter computation unit is configured to clamp the logratio to a minimum value based on a maximum allowed anisotropy setting.

* * * * *